(12) United States Patent
Tiittanen et al.

(10) Patent No.: US 7,694,085 B2
(45) Date of Patent: Apr. 6, 2010

(54) WARMING LARGE DYNAMIC DATA IN REDUNDANT FUNCTIONAL UNIT

(75) Inventors: Tero Tiittanen, Vantaa (FI); Philippe Rua, Helsinki (FI); Paivi Tahja, Vantaa (FI)

(73) Assignee: Nokia Corporation, Espoo (FI)

( * ) Notice: Subject to any disclaimer, the term of this patent is extended or adjusted under 35 U.S.C. 154(b) by 1003 days.

(21) Appl. No.: 10/988,579

(22) Filed: Nov. 16, 2004

(65) Prior Publication Data

US 2005/0102558 A1    May 12, 2005

Related U.S. Application Data

(63) Continuation of application No. PCT/FI02/00519, filed on Jun. 14, 2002.

(51) Int. Cl.
    *G06F 12/00*      (2006.01)
(52) U.S. Cl. .................... 711/161; 707/204; 709/217; 711/162; 714/6
(58) Field of Classification Search ................ 711/161, 711/162; 707/204; 714/6, 13
See application file for complete search history.

(56) References Cited

U.S. PATENT DOCUMENTS

| | | | |
|---|---|---|---|
| 4,371,754 A | 2/1983 | De et al. | |
| 5,367,674 A | 11/1994 | Berk et al. | |
| 5,469,503 A | 11/1995 | Butensky et al. | |
| 5,963,634 A | 10/1999 | Kantola et al. | |
| 6,085,298 A * | 7/2000 | Ohran ........................ 711/162 |
| 6,615,365 B1 * | 9/2003 | Jenevein et al. ................. 714/6 |
| 7,149,787 B1 * | 12/2006 | Mutalik et al. ............. 709/217 |
| 2003/0177306 A1 * | 9/2003 | Cochran et al. ............. 711/114 |

FOREIGN PATENT DOCUMENTS

| | | |
|---|---|---|
| EP | 0 943 997 A2 | 9/1999 |
| WO | WO 03/107187 | 12/2003 |

* cited by examiner

*Primary Examiner*—Christian P Chace
*Assistant Examiner*—Matthew Bradley
(74) *Attorney, Agent, or Firm*—Mintz, Levin, Cohn, Ferris, Glovsky, and Popeo, P.C.

(57) ABSTRACT

The present invention describes a warming procedure for warming redundant functional units. The solution described in the present invention keeps the functional unit during most of the warming in a state where it is able to serve new configuration requests. The working unit side may still be locked but for a shorter amount of time than earlier. The present invention makes it easy to warm various kinds of data areas in multiple clients without a need to organize or classify the data for warming purposes. Data is treated as bulk bytes.

The present invention further describes a warming manager which controls the warming procedure. The warming procedure is based on the fact that the warming manager takes one or more snapshots of the dynamic data of the warmable objects, and transfers only differences in the dynamic data between two consecutive snapshots to the warming manager of the spare unit side.

12 Claims, 6 Drawing Sheets

WARMING LARGE DYNAMIC DATA IN REDUNDANT FUNCTIONAL UNIT

This is a Continuation of International Application No. PCT/FI02/00519 filed Jun. 14, 2002, which designated the U.S. and was published under PCT Article 21(2) in English.

FIELD OF THE INVENTION

The present invention relates to information technology. Especially the present invention describes a method for warming a large dynamic data in a redundant functional unit.

BACKGROUND OF THE INVENTION

There are a lot of modern information technology systems that are required to serve continuously, e.g. different kinds of computer and telecommunication networks. These so called critical systems also require tuning and updating, and it should be possible to do without interruptions, or at least with as short service interruption as possible. The traditional solution is to have a working unit and a spare unit. The working unit serves normally, and in case of breakdown or updating of the working unit, the spare unit continues providing services. The spare unit is able to replace the working unit because it comprises the same information as the working unit. Furthermore, requests coming to the working unit are also directed to the spare unit in order to maintain the consistency of the two units.

Let us assume that, for some reason, the spare unit is e.g. replaced with a new spare unit. Naturally, the new spare unit does not contain the same information as the working unit because it has been booted up. After the boot-up, in order to achieve the 2N redundant feature, the new spare unit needs to be loaded e.g. with necessary configuration data from the working unit. The term "warming" in the claims is used by the claims to mean a procedure of restoring information to a new unit.

Static data does not need to be warmed at all. It can be generated by the programs independently (during unit start-up phase). The amount of dynamic data is the key question. If there is only a little amount of dynamic data, no long interruptions are needed because the working unit can be locked during the warming procedure. Otherwise, long locking periods are needed. However, in case of dynamic data, the data may not be copied in small pieces because the dynamic data can change with time.

The traditional way to do the warming procedure is to lock both the working unit and the spare unit, and copy all the data to the spare unit in one pass. By locking both units, the spare unit will become identical with the working unit. This means that incoming configuration requests have to be queued or acknowledged with a negative status. Negative status refers to a situation where configuration requests cannot be processed.

In both cases, new configurations cannot be created during a long period of time because the transferring capacity between the working unit and the spare unit is limited.

The locking of the working unit causes an interruption in the service. Blocked requests can be rejected, queued or redirected to other unit(s). The duration of the interruption depends on the amount of the data needed to be copied. The problem of the copying in one pass is the time needed for the warming procedure. In case of large dynamic data, the service interruption is considered to be too long. One solution is to have greater bandwidth between the working unit and spare unit to make the data transfer faster.

Another solution for shortening the locking time can be partitioning the warming data into small blocks, and lock only one block at a time. If the configuration action depends on large amount of dynamic data, this approach is not an appropriate solution to be used. Furthermore, if the configuration action causes changes in the various parts of the dynamic data, the partitioning of the warming procedure gets more complicated and warming in small blocks will be very hard to implement.

Yet another solution to implement warming is the following. A copy of the dynamic data can be gathered by an external party which, in the first place, requests configuration actions. Then it's up to this party and the spare unit to get the spare unit up-to-date by using the gathered data. The working unit is not needed to take part in this procedure. This approach has its problems though: a copy of all dynamic data is needed to be stored in some central place. Also some kind of locking is needed for the copying of the data.

PURPOSE OF THE INVENTION

The present invention alleviates the above-identified problems in warming the large amount of the dynamic data. Particularly the present invention shortens the lockup situations in the warming procedure and makes service interruption periods shorter.

SUMMARY OF THE INVENTION

The present invention describes a method for warming dynamic data in a redundant functional unit. The functional unit comprising at least a working unit and a spare unit, wherein configuration data is delivered to both the working unit and the spare unit. The working unit comprises one or more warmable objects, and the dynamic data of one or more warmable objects of the working unit is copied to one or more warmed objects of the spare unit. The spare unit is locked during the warming procedure.

In the present invention, one or more snap-shots of the dynamic data of one or more warmable objects of the working unit are taken into a first buffer memory of the working unit. The differences between consecutive snapshots are determined after each snapshot and transferred to a second buffer memory of the spare unit after each snapshot. When the final snapshot has been taken and the differences between the final snapshot and the previous snapshot have been transferred to the second buffer memory of the spare unit, the contents of the second memory buffer are written in one or more warmed objects of the spare unit. The spare unit lock can now be unlocked.

The present invention describes a warming procedure for warming redundant functional units. The solution described in the present invention keeps the functional unit during most of the warming in a state where it is able to serve new configuration requests. The working unit side may still be locked but for a shorter amount of time than earlier. The present invention makes it easy to warm various kinds of data areas in multiple clients without a need to organise or classify the data for warming purposes. Data is treated as bulk bytes.

Furthermore, the present invention describes a warming manager which controls the warming procedure. It orders a 'start warming' message from a recovery subsystem of the network element.

The warming procedure is based on the fact that the warming manager takes one or more snapshots of the dynamic data of the warmable objects and transfers only differences in the dynamic data between two consecutive snapshots to the warming manager of the spare unit side. Furthermore, a threshold value representing the minimum amount of differences between two consecutive snapshots is determined. When the threshold value is triggered, a final (last) snapshot of the dynamic data will be taken.

Locking of the working unit and/or spare units are/is an important factor in the present invention. The spare unit is kept locked during the warming procedure.

In one embodiment, the working unit is not locked when taking a snapshot. The requests that arrive at the working unit while the snapshot of the dynamic data is taken are buffered and handled only after the snapshot has been taken.

In another embodiment, also the working unit may or may not be locked during the period when a snapshot is taken. For example, the working unit does not necessarily need to be locked during the first rounds of the warming. The disadvantage of this is that the last transfer cannot be entered on these rounds because the contents of the data have probably changed during the comparison. Locking of the working unit may be needed during the whole final (last) transfer of differences in order to reach an identical state between the working and spare unit. Locking may also be needed during some rounds before the final transfer because it is not known if the round is the last round until it has already started. There are two alternatives to that: either the locking of the working unit is started on some fixed transfer round (but not on the first round) or after a first 'under the threshold' round has been occurred.

In one embodiment, the working unit does not need to be kept locked during the last transfer and spare unit writing when doing the following: when the sending warming manager decides that it is time for the final (last) transfer, the spare unit lock is kept on but configuration requests arriving at the working unit are buffered. The lock is released and configuration requests are started to be handled after dynamic data is written to the programs. However, during the final (last) round, also spare unit SP configuration requests need to be buffered. They do not need to be buffered during the previous rounds and if rejecting is used on the working unit, they never need to be buffered.

The present invention dramatically shortens the moments when the working unit is unable to serve new configuration requests. In addition to that, the moments are distributed over a long period of time meaning that the working unit should be able to clear the message queue which might have accumulated during reading the dynamic data with the warming manager.

Furthermore, the present invention describes a solution that makes warming easy to use from the client's point of view. The clients do not need to divide the dynamic data in blocks or classify it in any other way. They just provide a function to copy all dynamic data to the temporary storage area of the warming manager.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
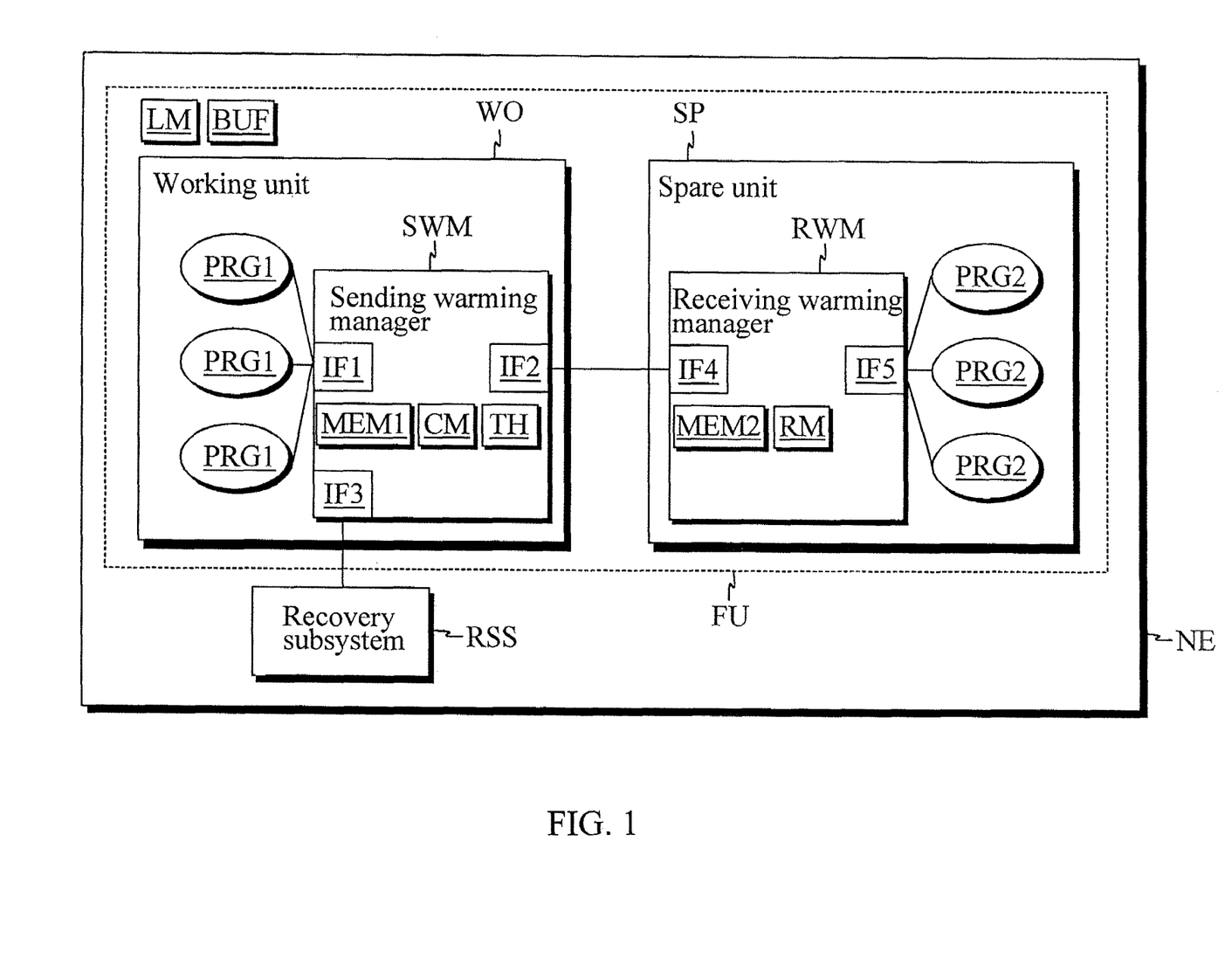
FIG. 1 illustrates an embodiment of the system in accordance with the present invention.

FIG. 1 represents a preferred embodiment of the system in accordance with the present invention. The system in FIG. 1 comprises a network element NE comprising a redundant functional unit FU. The functional unit FU consists of two identical plug-in-units, a working unit WO and a spare unit SP.

In a redundant functional unit, configuration data is delivered to both the working unit WO and the spare unit SP. Therefore, it is an important task to make the spare unit SP an identical copy of the working unit WO in a warming procedure. The warming procedure should not interfere the normal operation of the working unit much. In general, warming can be defined as updating the status data of process families in the spare unit using similar data of the working unit. The overall warming is the result of a group of warm-up events. After warming, the processes e.g. in two computers are in the same state and perform similarly at the same input. Then the spare unit is ready to perform tasks of the working unit. To achieve an effective way to implement the warming procedure, a warming manager is introduced. Both the working unit WO and the spare unit comprise a warming manager (SWM and RWM). The working unit WO comprises also one or more warmable objects PRG1 which contain dynamic data to be warmed, that is, to be copied to the spare unit SP as warmed objects PRG2.

The sending warming manager SWM comprises a first interface IF1 towards the working unit WO for acquiring dynamic data of one or more warmable objects PRG1 of the working unit WO. Further, the sending warming manager SWM comprises means SM for taking one or more snapshots of the dynamic data of the warmable objects PRG1 of the working unit WO using said first interface IF1, first memory means MEM1 for storing said snapshot data, calculating means CM for determining the differences in the data of two consecutive snapshots, and a second interface IF2 for sending the differences in the data of two consecutive snapshots to the receiving warming manager RWM of the spare unit SP. Furthermore, the sending warming manager SWM comprises a third interface IF3 to a recovery subsystem RSS of the network element NE for receiving a warming procedure request.

The implementation of the interface towards the clients the dynamic data of which is to be warmed is e.g. as follows: A shared memory type of mechanism is used to introduce a buffer memory common to the client and the warming manager. On the warming manager's request, the client writes all its dynamic data to the buffer memory. If dynamic data is stored in one structure, this can be done with a single memory copy function call.

In a preferred embodiment, the sending warming manager SWM comprises also a threshold value TH representing the minimum amount of differences between two consecutive snapshots, after which a final snapshot of the dynamic data of the warmable objects PRG1 of the working unit WO is taken. In other words, if the amount of differences in the dynamic data between two consecutive snapshots is lower than the threshold value, the next snapshot will be the final snapshot. The threshold value for the final transfer is decided e.g. based on the information how long locking situation can be on, and how fast data can be transferred. In the rare circumstances in which the differences are not converging to zero, the warming manager has to make the decision to end the warming anyway after a few iteration rounds.

The receiving warming manager RWM comprises a fourth interface IF4 to a sending warming manager SWM of the working unit WO for receiving differences in the data of two consecutive snapshots, second memory means MEM2 for storing the difference data, a fifth interface IF5 to the warmed objects PRG2 of the spare unit SP and writing means RM for storing the difference data in the second memory means MEM2 in the warmed objects PRG2 of the spare unit SP.

In a preferred embodiment, the warming manager is implemented as a separate program which has an efficient shared memory type of interface to the clients, and an asynchronous interface to recovery and to the sending warming manager SWM.

The functional unit FU comprises locking means LM for locking and unlocking the spare unit during the warming procedure. In one embodiment, also the working unit WO is locked when a snapshot is taken. In this case, new configuration requests may be buffered in a buffer BUF. Another possibility, in absence of the buffer BUF, is to reject the incoming requests.

The warming managers and the above mentioned means are in a preferred embodiment implemented with hardware and/or software components.

The network element NE of FIG. 1 is e.g. a Radio Network Controller (RNC) of the UTRAN (UMTS Radio Access Network) or the Mobile Services Switching Centre (MSC). However, the use of the present invention is not limited to mobile communication networks but it can also be used in other communication networks.

Figure 2:
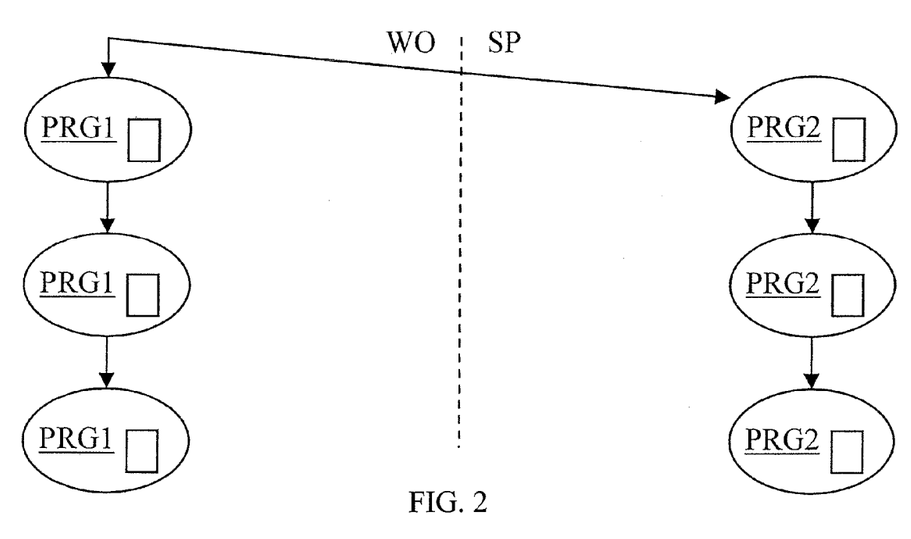
FIGS. 2-11 illustrate an embodiment of the present invention where a warming procedure is explained in accordance with the present invention.

FIGS. 2-11 illustrate the warming functionality of the present invention. In FIG. 2, a simplified system is represented. Only the relevant parts, that is, the working unit WO, the spare unit SP, warmable objects PRG1 and warmed objects PRG2 are represented.

A warming procedure for a spare unit SP usually has several characteristic features:
the amount of data to be warmed from the working unit WO to the spare unit SP is big,
transferring of the data from the working unit WO to the spare unit SP is usually the bottleneck, and
the working unit WO side cannot necessarily be locked for the whole transfer time. The length of the transfer time is e.g. more than 15 seconds. The system cannot be in a state in which it is not able to accept configuration requests for such a long time.

The solution represented in the present invention treats all warmable dynamic data as bulk bytes, and therefore does not assume any special structures inside the data. The warming concept can deal with any number of warmable objects (PRGs). FIGS. 2-13 represent only three warmable objects with which the warming concept is illustrated. In a preferred embodiment, all the warmable objects PRG1 are warmed at the same time because only then can the consistency of the dynamic data between all the objects be guaranteed.

Figure 3:
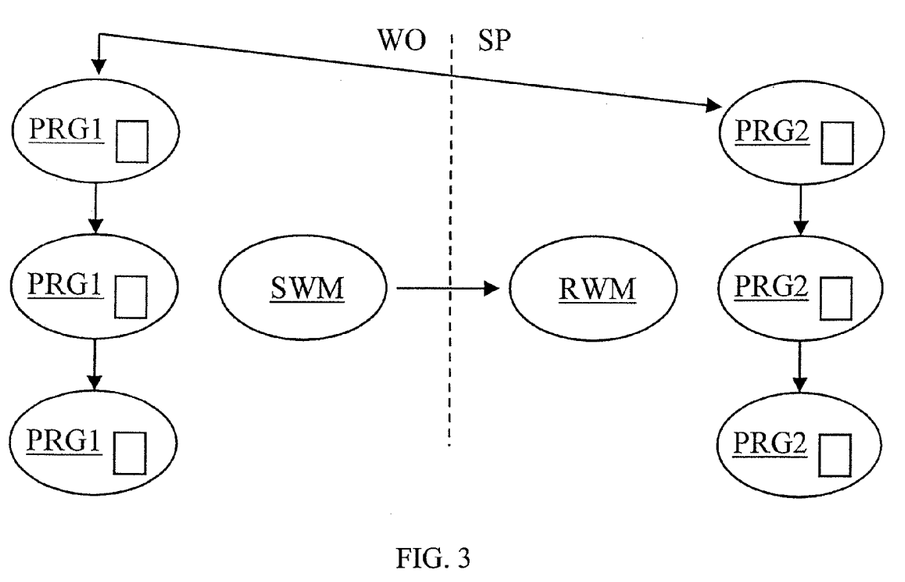

FIG. 2 represents the initial state of the warming procedure. The actual warming procedure is implemented by using a special component that is here called as a warming manager. FIG. 3 comprises two warming managers, the sending warming manager SWM and the receiving warming manager RWM.

Figure 4:
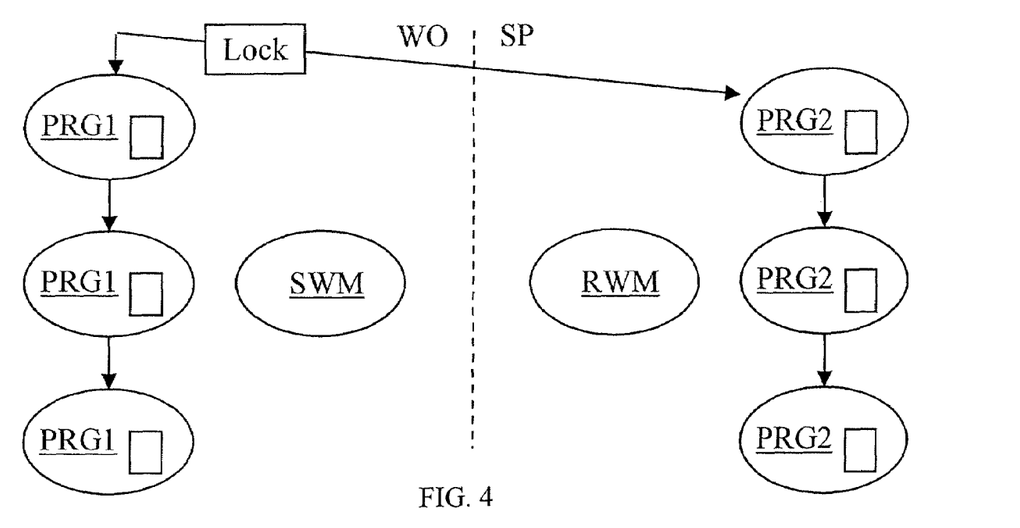
Figure 5:
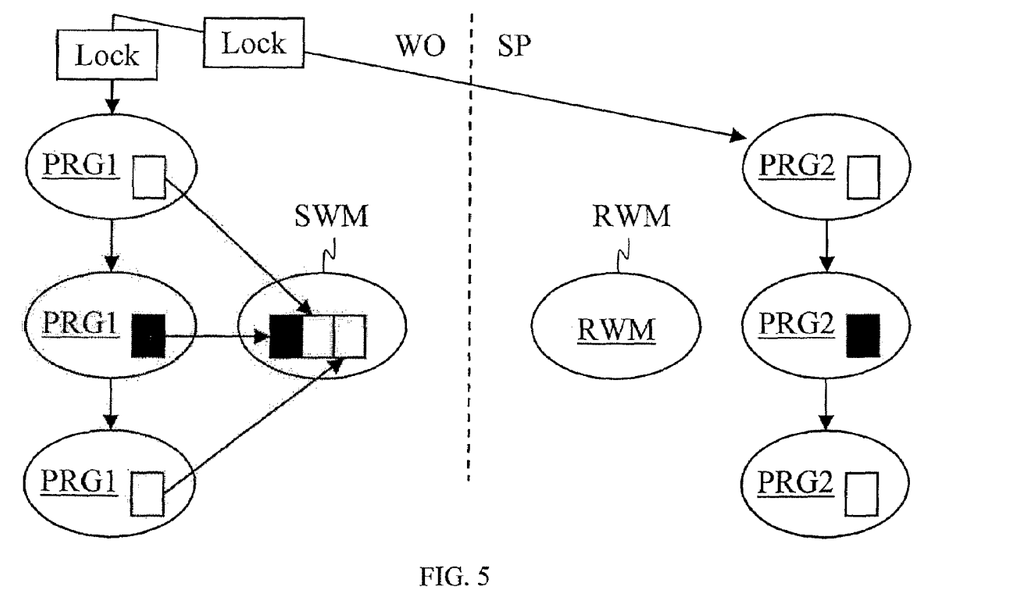

Configuration update messages towards the spare unit SP side are discarded during the whole warming procedure. In other words, the spare unit SP is locked, as illustrated in FIG. 4. Contents of the dynamic data are read from the working unit WO side to the internal memory of the sending warming manager SWM. In FIG. 5, the working unit WO side is locked during taking snapshots of the dynamic data. In practise the top of the program stack where the external requests arrive at is locked. However, the locking of the working unit WO side is not necessarily needed. In another embodiment of FIG. 5, the working unit WO is not locked but there exists a buffer that stores configuration requests arriving while the snapshots are taken. When the snapshots have been taken, the working unit WO accepts the buffered configuration requests.

Figure 6:
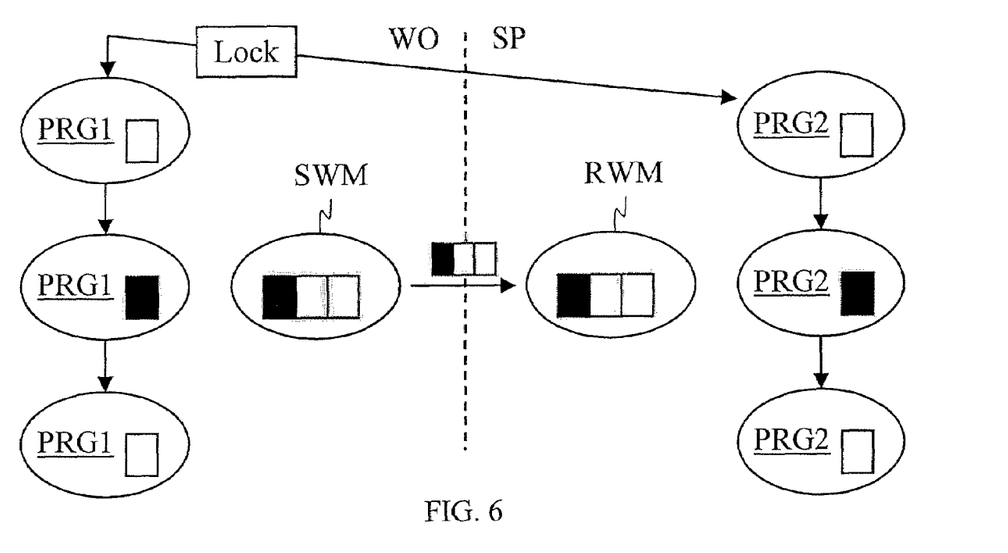

The snapshot taken is then transferred to the spare unit SP side. During this, the working unit WO can serve arriving configuration requests. This causes WO dynamic data to slowly diverge from the snapshot transferred to SP side. This is illustrated in FIG. 6.

Figure 7:
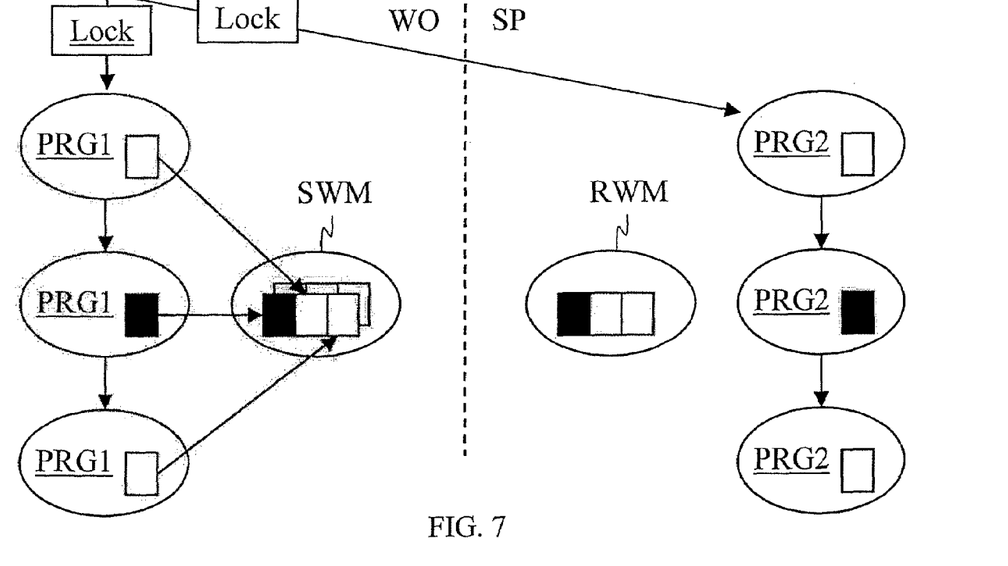
Figure 8:
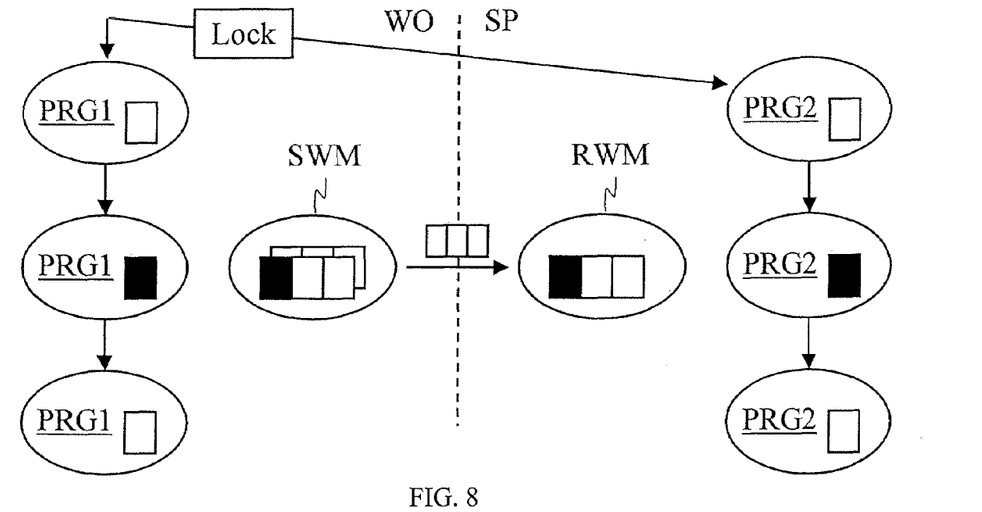

In FIG. 7, the working unit WO is locked again, and another snapshot is taken from the dynamic data. During the transfer of the first snapshot, the dynamic data in the working unit WO has been changed by new configuration requests. To cope with this, the warming procedure enters in a loop in which the working unit WO is locked, and a snapshot is taken. The latest snapshot is then compared to the previous snap-shot, and only the changes (differences) between the two snapshots are transferred to the receiving warming manager RWM that updates them to its internal memory, as illustrated in FIG. 8. During every pass of the loop, less differences are needed to be transferred which in turn means that the transfer takes a shorter time which in turn means that on the average, less changes have happened. Again, in another embodiment of FIG. 7, the working unit WO is not locked but the arriving configuration requests are buffered.

In one embodiment of the present invention, the comparison and transferring of the differences in the dynamic data are done as follows. When dynamic data is read from the working unit WO PRG1s in the subsequent turns after the first one, the old snapshot is replaced with the new one, and at the same time, data vectors are subtracted from each other. With this procedure, a vector results where a zero presents an unchanged data, and anything else other than zero changed data. This vector is then transferred to the spare unit SP using e.g. run length encoding which squeezes zeroes (or any runs) in the data. In the spare unit SP side, difference vector is just added to the local copy of the dynamic data. In this scheme, run length encoding implicitly acts as a protocol for marking and sending the differences.

In another embodiment of the present invention, warmable data is handled as blocks of equal size. Consecutive snapshots are compared block by block. The numbers of changed blocks are collected to a table and only changed blocks are sent. With the blocks, also some additional information is sent which identifies the blocks for the receiving warming manager RWM. After that, on the sending warming manager SWM side, the current 'new buffer' becomes the 'previous buffer' for the next round and the current 'previous buffer' becomes the 'new buffer'. Therefore, data copying between the buffers is not needed.

The idea of transferring only differences in the dynamic data makes it also possible to save time during the first transfer if the data areas contain lots of zeroes marking unused entries etc. Before reading anything from working unit WO, data images filled with zeroes are constructed to both buffer memories of the warming managers. There are at least two advantages when initialising the buffers with zeros. The first round can be handled identically compared to the following ones. The initialisation means also that only differences are transferred during the first round.

An interface between the warming manager and clients can be implemented with which the warming manager can ask the 'initial state' of the warmable data (the state that the data is after starting the programs). With this functionality the warming managers can independently produce a result of the initial state of the warmable data which is likely to correspond to the contents of the dynamic data in the working unit WO side better than just zeroes, especially if there has been only few configuration requests.

Figure 9:
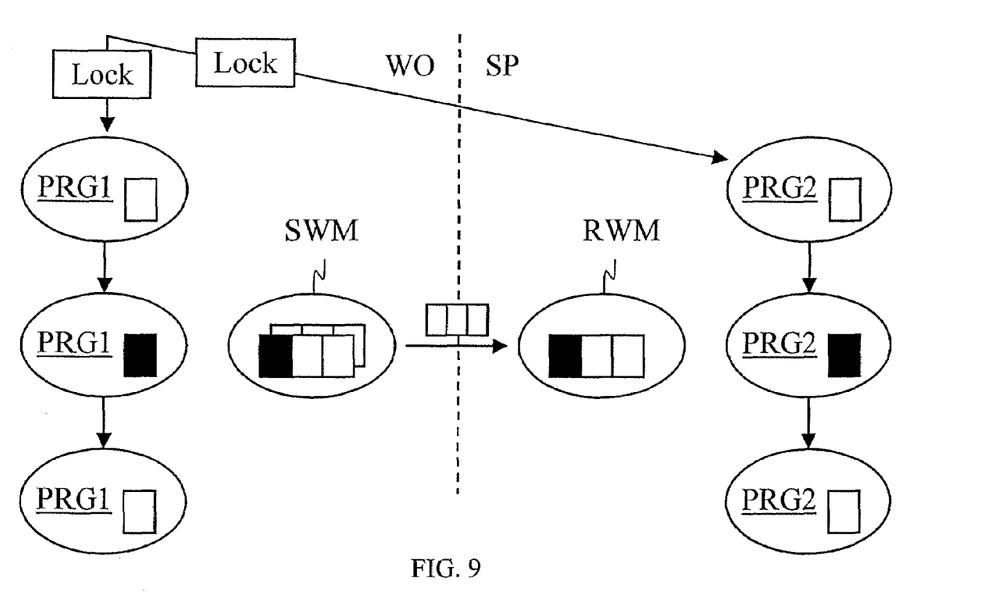
Figure 10:
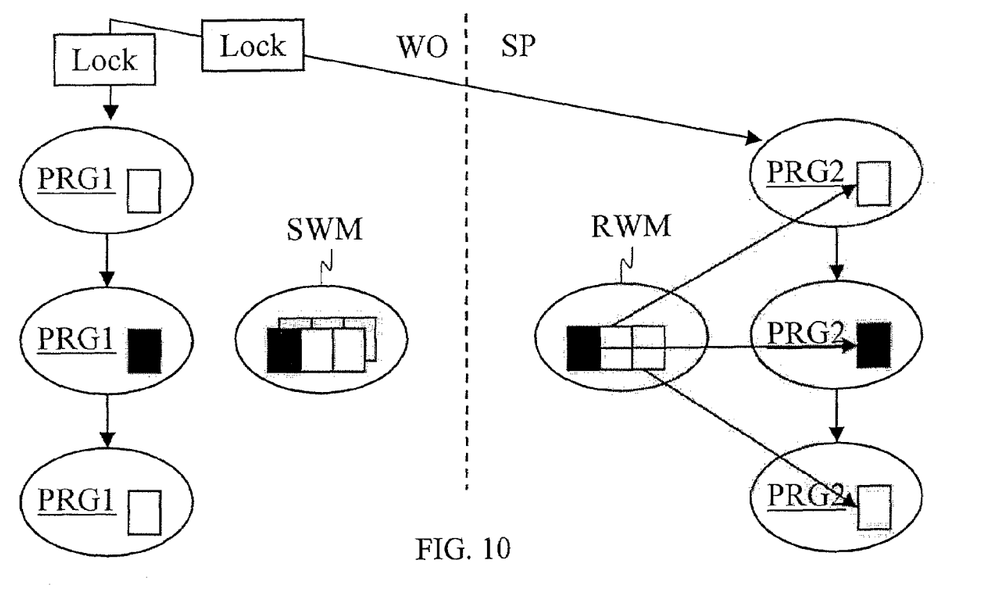

FIG. 9 illustrates the transfer of the final snapshot to the spare unit SP side. Taking snapshots, calculating the differences between consecutive snapshots and sending them are repeated until one of the following conditions are met:

The amount of differences has diminished under a predefined threshold value. Therefore, the WO lock can be kept on also during the transfer and final writing data to warmed objects PRG1 in the spare unit SP side, as illustrated in FIG. 10. Only then it is possible to achieve a consistency between the working unit WO and spare unit SP sides. In theory, this condition should be reached quite quickly because the amount of differences should diminish exponentially. Again, in another embodiment of FIG. 9, the working unit WO is not locked but the arriving configuration requests are buffered. However, during the final (last) round, also spare unit SP configuration requests need to be buffered. They do not need to be buffered during the previous rounds and if rejecting is used on the working unit, they never need to be buffered.

If, for some reason, the amount of differences has not diminished enough during the last couple of transfers, last transfer is carried out anyway to conclude the warming procedure.

Figure 11:
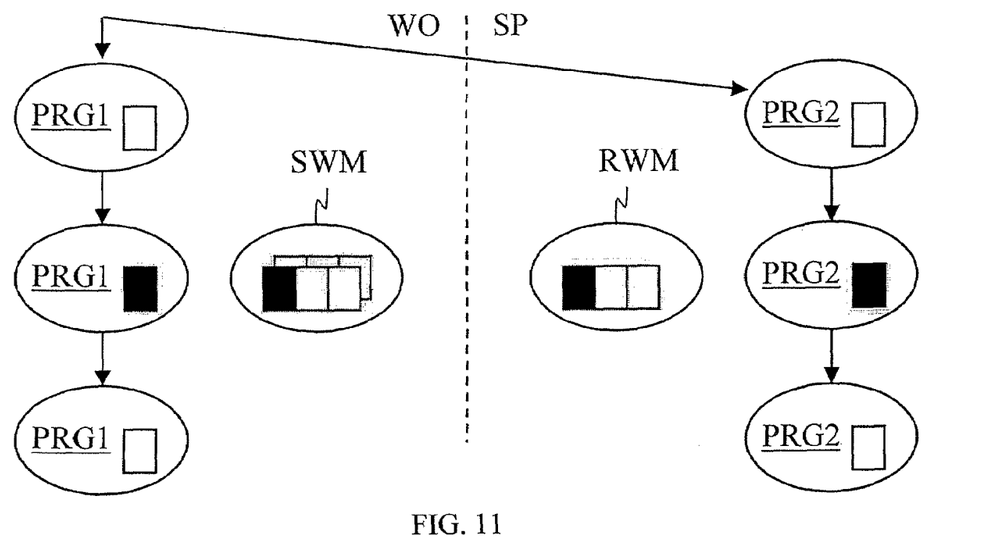

FIG. 11 represents the situation when the warming procedure is finished, and both the working unit WO side and the spare unit SP side comprise identical information. The locks are released synchronously so that the first configuration message coming to the spare unit SP corresponds to the first request coming to the working unit WO.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
   locking a spare device in a redundant functional device;
   delivering configuration data to a working device and said spare device in said redundant functional unit, wherein said working device comprises one or more warmable objects, and wherein dynamic data of said one or more warmable objects of said working device is copied to one or more warmed objects of said spare device;
   taking one or more snapshots of the dynamic data of said one or more warmable objects of said working device into a first buffer memory;
   determining the differences in the dynamic data between consecutive snapshots after each snapshot;
   transferring said differences in the dynamic data to a second buffer memory after each snapshot;
   determining a threshold value representing a minimum amount of differences in the dynamic data between two consecutive snapshots;
   when said threshold value is triggered, taking the final snapshot of the dynamic data of said one or more warmable objects of said working device;
   when the final snapshot has been taken and the differences in the dynamic data between said final snapshot and the previous snapshot has been transferred to said second buffer memory of said spare device, writing the contents of said second memory buffer to said one or more warmed objects of said spare device; and
   releasing said spare device lock.

2. The method according to claim 1, further comprising:
   locking also said working device before taking a snapshot; and
   releasing said working device lock when said snapshot has been taken.

3. The method according to claim 1, further comprising:
   buffering requests that arrive while a snapshot of the dynamic data of said one or more warmable objects of said working device is taken; and
   handling said requests only after said snapshot has been taken.

4. The method according to claim 3, wherein when said final snapshot has been taken, the method further comprises:
   handling said buffered requests only after the contents of said second memory buffer has been written to said spare device.

5. The method according to claim 1, further comprising: taking said final snapshot of the dynamic data of said one or more warmable objects of said working device in spite of that said threshold value is not triggered.

6. The method according to claim 1, further comprising:
   locking said working device before taking said final a snapshot; and
   releasing said working device lock only after when said final snapshot has been taken and the contents of said second memory buffer has been written in said one or more warmed objects of said spare device.

7. An apparatus, comprising:
   a first interface to one or more warmable objects configured to acquire dynamic data of said one or more warmable objects of a working device;
   a snapshot taker configured to take one or more snapshots of the dynamic data of said one or more warmable objects of said working device using said first interface;
   a threshold value representing the minimum amount of differences in the dynamic data between two consecutive snapshots, wherein the final snapshot of the dynamic data of said one or more warmable objects of said working device is taken when said threshold value is triggered;
   a first memory configured to store said snapshot data;
   a calculator configured to determine the differences in the data of two consecutive snapshots;
   a second interface configured to send said differences in the data of two consecutive snapshots to a receiving warming manager of a spare device; and
   a third interface to a recovery subsystem of the network device configured to receive a warming procedure request; a fourth interface to a sending warming manager of a working device configured to receive differences in data of two consecutive snapshots; a second memory configured to store said difference data; a fifth interface to one or more warmed objects of a spare device; and a writer configured to store said difference data in said second memory in one or more warmed objects of said spare device.

8. A system, comprising:
   at least one network device comprising at least one of a functional device, a working device, and a spare device, wherein configuration data is delivered to both said working device and said spare device, and wherein said working device comprises one or more warmable objects, and wherein the dynamic data of said one or more warmable objects of said working device is copied to one or more warmed objects of said spare device;
   a locking device configured to lock and unlock said spare device;

a receiving warming manager; and a sending warming manager comprising a first interface to said working device configured to acquire dynamic data of one or more warmable objects of said working device, a taker configured to take one or more snapshots of the dynamic data of one or more warmable objects of said working device using said first interface, wherein said taker is configured to take the final snapshot of the dynamic data of said one or more warmable objects of said working device when a threshold value representing the minimum amount of differences in the dynamic data between two consecutive snapshots is triggered, a first memory configured to store said snapshot data, a calculator configured to determine the differences in the data of two consecutive snapshots, a second interface configured to send said differences in the data of two consecutive snapshots to said receiving warming manager of said spare device, and a third interface to a recovery subsystem of said network device configured to receive a warming procedure request, wherein said receiving warming manager comprises a fourth interface to said sending warming manager of said working device configured to receive differences in the data of two consecutive snapshots, a second memory configured to store said difference data, a fifth interface to one or more warmed objects of a spare device, and a writer configured to store said difference data in said second memory in one or more warmed objects of said spare device.

9. The system according to claim 8, further comprising: a locking device configured to lock and unlock said working device.

10. The system according to claim 8, further comprising: a buffer configured to buffer requests that arrive while a snapshot of the dynamic data of said one or more warmable objects of said working device is taken.

11. An apparatus, comprising:

first interface means to one or more warmable objects for acquiring dynamic data of said one or more warmable objects of a working device;

taking means for taking one or more snapshots of the dynamic data of said one or more warmable objects of said working device using said first interface, wherein said taking means are configured to take the final snapshot of the dynamic data of said one or more warmable objects of said working device when a threshold value representing the minimum amount of differences in the dynamic data between two consecutive snapshots is triggered;

first memory means for storing said snapshot data;

calculating means for determining the differences in the data of two consecutive snapshots;

second interface means for sending said differences in the data of two consecutive snapshots to a receiving warming manager of a spare device; and third interface to a recovery subsystem of the network device for receiving a warming procedure request; fourth interface means to a sending warming manager of a working device for receiving differences in data of two consecutive snapshots; second memory means for storing said difference data; fifth interface means to one or more warmed objects of a spare device; and writing means for storing said difference data in said second memory in one or more warmed objects of said spare device.

12. A system, comprising:

at least one network device comprising at least one of functional means, a working means, and spare means, wherein configuration data is delivered to both said working means and said spare means, and wherein said working means comprises one or more warmable objects, and wherein the dynamic data of said one or more warmable objects of said working means is copied to one or more warmed objects of said spare means; locking means for locking and unlocking said spare device;

receiving warming manager means; and sending warming manager means comprising first interface means to said working device for acquiring dynamic data of one or more warmable objects of said working device, taking means for taking one or more snapshots of the dynamic data of one or more warmable objects of said working device using said first interface, wherein said taking means are configured to take the final snapshot of the dynamic data of said one or more warmable objects of said working device when a threshold value representing the minimum amount of differences in the dynamic data between two consecutive snapshots is triggered, first memory means for storing said snapshot data, calculating means for determining the differences in the data of two consecutive snapshots, second interface means for sending said differences in the data of two consecutive snapshots to said receiving warming manager means of said spare device, and third interface means to a recovery subsystem of said network device for receiving a warming procedure request, wherein said receiving warming manager means comprises fourth interface to said sending warming manager means of said working device for receiving differences in the data of two consecutive snapshots, second memory means for storing said difference data, fifth interface means to one or more warmed objects of a spare device, and writing means for storing said difference data in said second memory means in one or more warmed objects of said spare means.

\* \* \* \* \*